United States Patent [19]
Axelrod

[11] Patent Number: 6,110,521
[45] Date of Patent: *Aug. 29, 2000

[54] WHEAT AND CASEIN DOG CHEW WITH MODIFIABLE TEXTURE

[75] Inventor: Glen S. Axelrod, Mahwah, N.J.

[73] Assignee: T.F.H. Publications, Inc., Neptune City, N.J.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/116,070

[22] Filed: Jul. 15, 1998

Related U.S. Application Data

[63] Continuation-in-part of application No. 08/993,748, Dec. 19, 1997, which is a continuation-in-part of application No. 08/738,423, Oct. 25, 1996, Pat. No. 5,827,565.

[51] Int. Cl.[7] .............................. A21D 10/00; A23K 1/18
[52] U.S. Cl. ......................... 426/549; 426/623; 426/630; 426/635; 426/805; 426/622
[58] Field of Search .................................. 426/549, 805, 426/623, 630, 635, 622

[56] References Cited

U.S. PATENT DOCUMENTS

| | | | |
|---|---|---|---|
| 3,821,446 | 6/1974 | Estey et al. | 426/373 |
| 3,899,607 | 8/1975 | Miller et al. | 426/285 |
| 4,032,665 | 6/1977 | Miller et al. | 426/104 |
| 4,171,383 | 10/1979 | Chwalek et al. | 426/623 |
| 4,310,558 | 1/1982 | Nahm, Jr. | 426/98 |
| 4,315,034 | 2/1982 | Levinson et al. | 426/104 |
| 4,735,808 | 4/1988 | Scaglione et al. | 426/62 |
| 4,784,860 | 11/1988 | Christensen et al. | 426/46 |
| 4,800,099 | 1/1989 | Gellman et al. | 426/641 |
| 4,886,440 | 12/1989 | Forrest et al. | 425/208 |
| 4,892,748 | 1/1990 | Andersen et al. | 426/635 |
| 5,000,973 | 3/1991 | Scaglione et al. | 426/549 |
| 5,094,870 | 3/1992 | Scaglione et al. | 426/549 |
| 5,200,212 | 4/1993 | Axelrod | 426/2 |
| 5,240,720 | 8/1993 | Axelrod | 426/2 |
| 5,296,209 | 3/1994 | Simone et al. | 424/49 |
| 5,419,283 | 5/1995 | Leo | 119/709 |
| 5,476,069 | 12/1995 | Axelrod | 119/709 |
| 5,591,491 | 1/1997 | Ando | 427/544 |

FOREIGN PATENT DOCUMENTS

| | | |
|---|---|---|
| 337573 | 10/1989 | European Pat. Off. . |
| 2705864 | 6/1993 | France . |
| 3701861 | 8/1988 | Germany . |
| 19501142 | 7/1995 | Germany . |

*Primary Examiner*—Chhaya D. Sayala
*Attorney, Agent, or Firm*—Hayes, Soloway, Hennessey, Grossman & Hage, P.C.

[57] ABSTRACT

A completely digestible highly nutritious dog chew formulated primarily of wheat flour, casein and starch carbohydrate, the texture of hardness of which is easily modified to suit a particular dog by the dog owner. By irradiating the chew in a microwave oven, the chew is caused to expand and is thereby rendered more easily chewable.

13 Claims, 1 Drawing Sheet

WHEAT AND CASEIN DOG CHEW WITH MODIFIABLE TEXTURE

This application is a continuation-in-part of U.S. patent application Ser. No. 08/993,748 filed Dec. 19, 1997, which is a continuation-in-part of U.S. patent application Ser. No. 08/738,423, filed Oct. 25, 1996 now U.S. Pat. No. 5,827,565.

BACKGROUND OF THE INVENTION

1. Field of the Invention

The present invention relates to dog chews and more particularly pertains to heat-modifiable edible dog chews.

2. Brief Description of the Prior Art

Most dogs enjoy chewing on things although preferences vary as to the hardness of the substances favored. Some dogs like to chew on very hard materials such as cow bones, wood, nylon or polyurethane, others prefer softer chews such as rawhide, while still others favor freeze dried snacks. Some dogs, due to their age, may not be able to chew on the very hard substances. Young dogs have insufficiently developed teeth, while old dogs may have diseased gums or may have lost some of their teeth.

Many indigestible objects are given to dogs as a chew and although the dogs may enjoy chewing thereon, the objects are often swallowed in whole or in part. Once swallowed, these objects or fragments thereof can have an adverse effect on the dogs digestion and can become impacted in the dog's intestinal tract with life-threatening consequences. By way of example, dog chews have been marketed which utilize an ethylene copolymer which can be fractured by the chewing action of a dog, and when ingested can block the dog's stomach passages.

In an attempt to make certain edible chews more appealing to dogs, a wide variety of additives are incorporated in products that, apart from being low in nutritional value, do not comprise particularly healthy supplements to a dog's diet. Often times the chew's taste is enhanced in order to make the particular chew more appealing to dogs who are otherwise not drawn to its hardness or texture.

Other edible dog chews have been marketed which have a comparatively short shelf life and therefore must be replaced by retail outlets at frequent intervals. Yet other prior art dog chews are lacking in structural integrity whereby they are susceptible to breakage during handling and shipping.

SUMMARY OF THE INVENTION

The present invention provides a dog chew that is completely digestible, highly nutritious, devoid of deleterious additives and is of a modifiable texture or hardness quickly and easily tailorable by the owner to suit the need or preference of his particular dog. The chew includes ingredients, which are molded into preselected shapes and may be packaged in moisture-proof packaging to maintain a preselected moisture content during storage and handling. Upon removal from the package, the chew can be caused to swell up four to eight times its original volume, if desired, by subjecting it to microwave radiation. With this procedure, the chew's texture or hardness can be adjusted from its original high density, extremely hard state, to a low density, expanded, easily chewed state depending on the amount of microwave exposure. The chew can thereby quickly and easily be tailored to the texture preference of a wide variety of dogs, from a strong, large, healthy dog to a small puppy with puppy teeth or an older dog with decayed molars. In addition, dog chews embodying the present invention can provide a long shelf life, e.g., three to six years or more.

More particularly, a formulation according to the present invention comprises the intermixing of about 40% by weight wheat flour, about 55% by weight casein, about 5% by weight starch carbohydrate (humectant), and optionally with 1 to 5% gelatin by weight. Additionally, a very small amount of flavoring and coloring can be added to enhance taste and appearance. The mixture is subsequently melted by heat and pressure and molded into preselected shapes. The temperatures, moisture levels and handling during the mixing and molding and subsequent packaging procedure are precisely controlled to ensure that the resulting product has a moisture content of between 10–14%, and preferably at least 12%. The resulting chew is hard while an approximate one half to three minute exposure within a standard household microwave oven results in a light, easily chewed product for the dog.

Other features and advantages of the present invention will become apparent from the following detailed description, taken in conjunction with the accompanying drawings, which illustrate by way of example, the principles of the invention.

DETAILED DESCRIPTION OF A PREFERRED EMBODIMENT

The present invention provides a highly nutritious, completely digestible dog chew. The dog owner can quickly and easily modify the texture or hardness of the chew to suit his particular dog by simply microwaving the chew for a short period of time.

The ingredients initially combined to form the chew of the present invention include a mixture of water, about 40% by weight wheat flour, about 55% casein, about 5% by weight starch carbohydrate (humectant) and optionally, about 1 to 5% gelatin by weight. The wheat flour should be of a fine consistency and may be made from USA red winter wheat for good results. The starch may be of vegetable origin, e.g., potatoes, corn or a mixture thereof. Casein which is a protein derived from milk is highly nutritious and easily digested by dogs. The gelatin content affects the hardness of the product, i.e., the higher the gelatin content, the softer the product.

Figure 1:
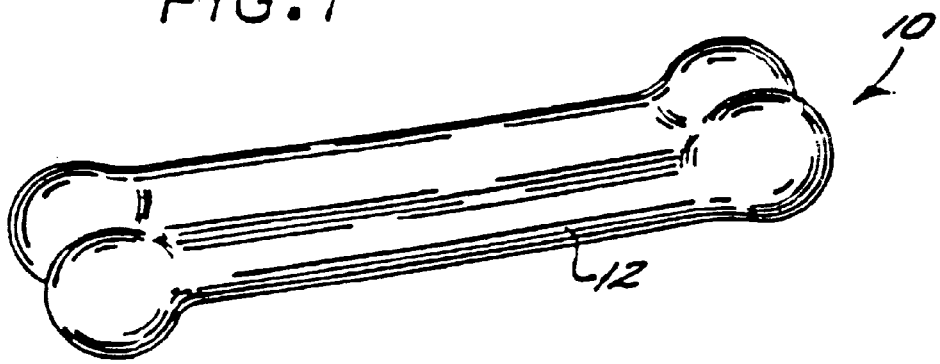
FIG. 1 illustrates the preferred embodiment of the invention in its unexpanded state.

In order to cause the components of the above-described ingredients to be intimately combined with one another, the mixture is heated to the components' melting temperatures of about 250° F. to 400° F. under 1,000–25,000 PSI pressure. Adjustment of the mixture's moisture content to about 20–30% is accomplished by either heating to drive off excess moisture, or steam injection, to increase moisture at which point the material is either extruded, or preferably, molded into preselected shapes. A standard injection moldings machine is the preferred method of producing the chews of the present invention. A bone shape for the chew, such as illustrated in FIG. 1 is preferred so that the public more readily recognizes the intended use of the product.

The molded product is dried to about 10–14% moisture content. Thereafter, the molded product is preferably packaged in moisture-proof packaging to preserve the moisture content of the chew at between the 10–14% magnitude. Higher or lower moisture content can affect the shelf-life of the product. Too much moisture causes the chew to deteriorate without the addition of stabilizers. Less than the 10–14% moisture level can render the product hygroscopic.

Figure 2:
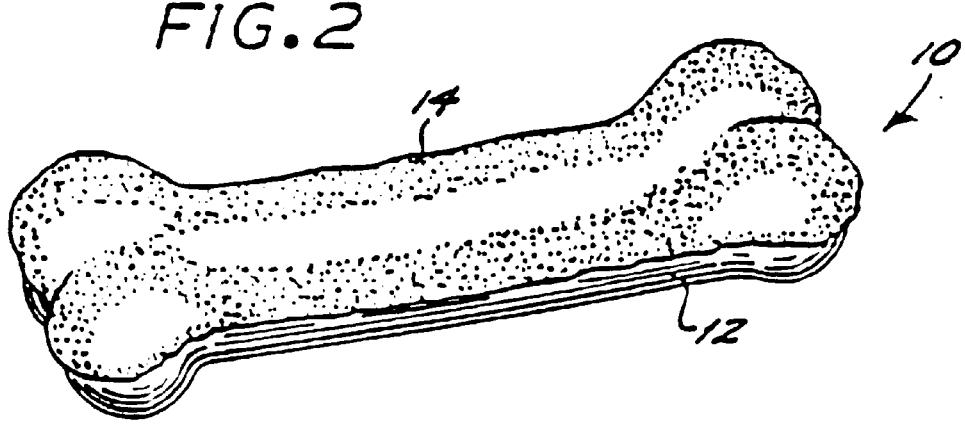
FIG. 2 illustrates the preferred embodiment of the invention in its partially expanded state.
Figure 3:
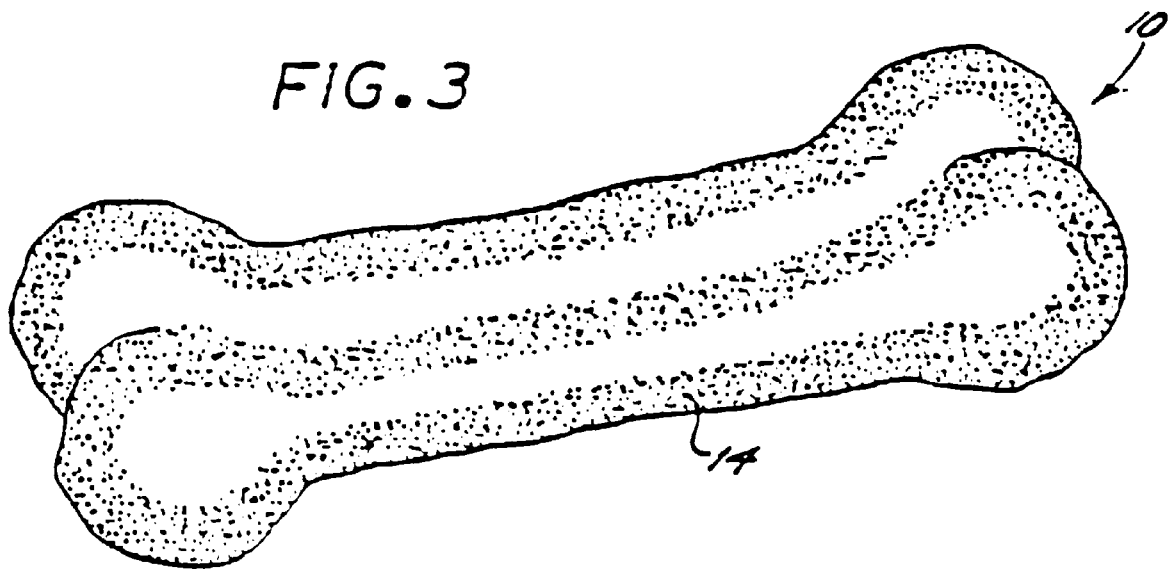
FIG. 3 illustrates the preferred embodiment of the invention in its fully expanded state.

Upon removal for the package, the person feeding the dog can modify the texture or hardness of the chew by heating in a microwave oven. The expansion of the moisture within the chew causes the chew to expand. Subjecting the chew to microwave radiation facilitates the heating of areas deep within the chew at the same time the exterior heats up and expands. FIG. 1 illustrates the chew 10 prior to heating, in which state, it has a substantially smooth exterior surface 12 and is of an extremely hard texture preferred by some dogs. A short exposure to microwave radiation initiates the expansion process. FIG. 2, illustrates the chew 10 in a partially expanded state evidenced by a partially bubbled surface 14. In this state, the chew 10 is of an intermediate hardness preferred by some dogs. FIG. 3, illustrates the chew 10 in fully expanded state as may result from a 30 to 180 second exposure in a standard household microwave oven. The entire chew 10 has a bubbled surface 14 and is easily chewable by most dogs. The chew in this state, is ideal for small dogs with puppy teeth or old dogs who suffer from gum disease or who may have lost teeth. Sufficient exposure to microwave radiation will cause the chew to expand four to eight times its original volume, with a commensurate reduction in hardness. In a preferred method of making the dog chew of the present invention, about 40 pounds of wheat flour, about 55 pounds of rennet casein, about 5 pounds of starch carbohydrate (humectant) and about 2 pounds of gelatin are screened to about 30 mesh and are then intermixed in a conventional injection molding machine hopper blender. Attractants, such as beef or ham flavoring, as well as colorings, can be added in very small quantities e.g., 1 . 5% to enhance the appeal of the product to both the dog as well as the buyer. Vitamins can also be added. A feeding screw transports the intermixed material to an injection molding machine. The stresses imposed by the mechanical action on the material substantially raises its temperature while steam injection can be employed to ensure that a sufficiently high temperature is attained wherein the mixture melts and is moldable. Depending on the type of injection molding machine utilized and the characteristics of the specific casein and gelatin, molding temperatures can vary from about 250° F. to 400° F. and under 1,000–25,000 PSI of pressure. The molded chew is dried to about 10–14% moisture and then preferably packaged in a moisture proof packing to ensure that no moisture is lost.

In use, the chew is given to the dog in its initial and hardest state. If the dog is unwilling or unable to chew on it, the chew is microwaved for short time increments and re-offered to the dog until the chew reaches a state of expansion and a degree of hardness preferred by the dog. Large, strong and healthy dogs would probably prefer the chew in its unmodified and hardest state while very small, young or very old dogs would prefer the chew in its most expanded state.

It should be particularly noted that an edible dog chew made in accordance with the present invention does not dry out and fall apart after being packaged and accordingly can have a shelf life of several years even without being packaged in a waterproof container. Additionally, the dog chew is extremely resistant to breakage during shipping and handling.

While a particular form of the invention has been illustrated and described, it will also be apparent to those skilled in the art that various modifications can be made without departing from the spirit and scope of the invention. Accordingly, it is not intended that the invention be limited except by the appended claims.

What is claimed is:

1. A method of producing a hardness-adjustable edible dog chew, consisting essentially of the steps of forming a mixture consisting essentially of wheat flour, casein, water and a starch carbohydrate as a humectant, and adjusting the water content of said mixture to about 20–30 wt. %; and injection molding such mixture into the shape of the dog chew, wherein said water content, subsequent to injection molding, is reduced below said 20–30 wt. %, and packaging sail dog chew wherein the hardness of said chew can be adjusted by microwave heating.

2. The method of claim 1 wherein said starch is derived from potatoes, corn or a mixture thereof.

3. The method of claim 1 wherein said starch is present at about 5% by weight.

4. The method of claim 1 wherein said wheat flour is present at about 40% by weight.

5. The method of claim 1 wherein said casein is present at about 55% by weight.

6. The method of claim 1 wherein the moisture content subsequent to injection molding is adjusted to about 10–14% by weight.

7. The method of claim 6, wherein the moisture content subsequent to injection molding is about 12% by weight.

8. The method of claim 1 wherein said wheat flour is USA red winter wheat.

9. The method of claim 1 wherein said casein is derived from milk.

10. The method of claim 1 wherein said mixture also contains an attractant.

11. The method of claim 10 wherein said attractant is present at about 1–5% by weight.

12. The method of claim 10 wherein said attractant is selected from the group consisting of a beef flavoring, a ham flavoring, or mixtures thereof.

13. The method of claim 1 wherein said mixture is injection molded at a pressure of about 1000–2500 psi and at a temperature of about 250–400° F.

* * * * *

UNITED STATES PATENT AND TRADEMARK OFFICE
CERTIFICATE OF CORRECTION

PATENT NO. : 6,110,521  
DATED : August 29, 2000  
INVENTOR(S) : Glen S. Axelrod Page 1 of 1

It is certified that error appears in the above-identified patent and that said Letters Patent is hereby corrected as shown below:

<u>Column 4, claim 1,</u>  
Line 26, change "sail" to -- said --.

Signed and Sealed this

Nineteenth Day of February, 2002

Attest:

*Attesting Officer*

JAMES E. ROGAN  
*Director of the United States Patent and Trademark Office*